P. GAISER.
PRESSURE GAUGE.
APPLICATION FILED MAR. 5, 1920.
1,414,122.
Patented Apr. 25, 1922.
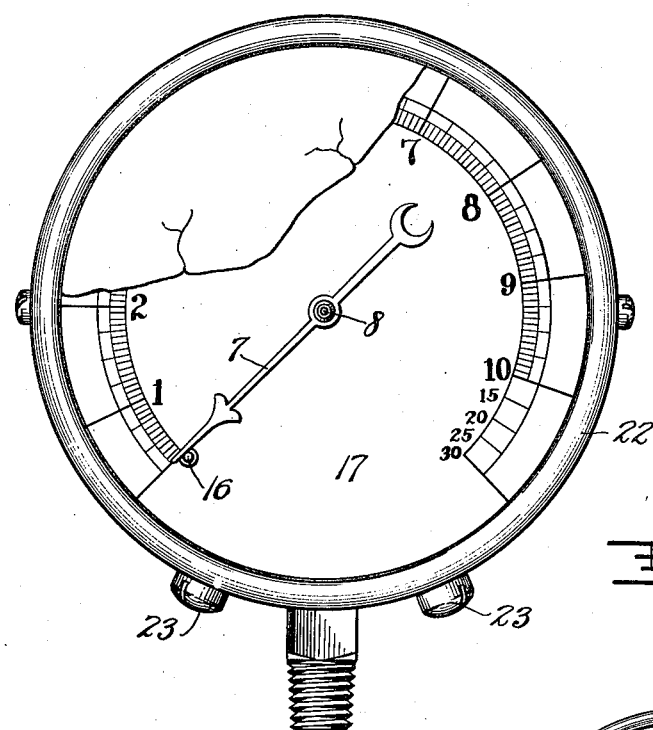
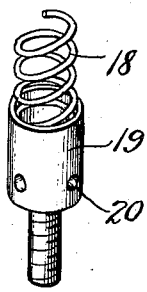
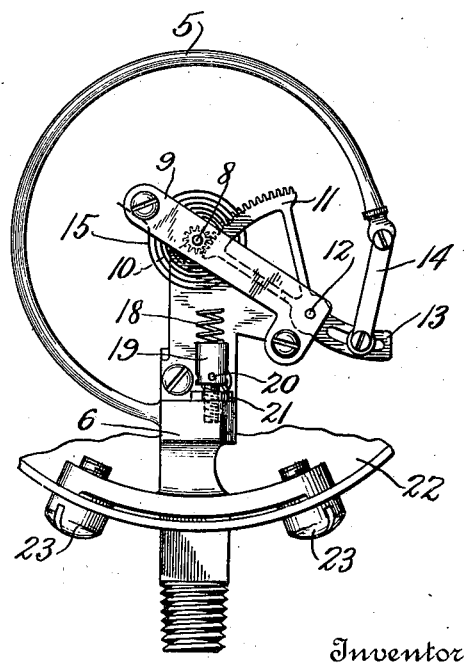
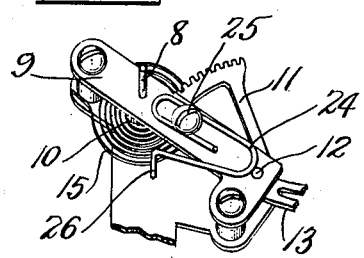
Inventor
Paul Gaiser
By his Attorneys

UNITED STATES PATENT OFFICE.

PAUL GAISER, OF SELLERSVILLE, PENNSYLVANIA, ASSIGNOR TO UNITED STATES GAUGE COMPANY, OF NEW YORK, N. Y., A CORPORATION OF PENNSYLVANIA.

PRESSURE GAUGE.

1,414,122.     Specification of Letters Patent.     Patented Apr. 25, 1922.

Application filed March 5, 1920. Serial No. 363,630.

*To all whom it may concern:*

Be it known that I, PAUL GAISER, a citizen of the United States of America, residing at Sellersville, Bucks County, Pennsylvania, have invented a new and useful Pressure Gauge, of which the following is a specification.

My invention relates particularly to a gauge of the Bourdon type and the main object is to provide a simple, compact and inexpensive construction in which there are two different scale readings, one of which has widely spaced markings for accurate reading and the other of which has more closely spaced markings for more approximate readings over a wider range of pressures.

Another object is to provide a construction which can be readily adjusted so as to coordinate accurately the indicating pointer and the upper scale readings.

Another object is to insure permanence of accuracy even though the device is subjected to severe handling.

Another object is to provide a construction in which the accuracy of the gauge in the upper scale readings is independent of the casing.

In its simplest form the invention contemplates the employment of a small adjustable spring carried by the frame or base of the tube and interposed in the path of movement of the multiplying sector.

Fig. 1 is a front view of a gauge embodying the improvements of my invention indicating conventionally a part of the usual glass front.

Fig. 2 is a front view with the dial removed and showing only a fragment of the casing.

Fig. 3 is a detail perspective view of the retard device.

Fig. 4 is a perspective view of a modified form of retard device.

The Bourdon tube 5 is of the usual type supported by a base 6 adapted to be secured on to the pipe or nipple of the system or device whose pressure is to be indicated.

The pointer 7 is mounted on a pivot shaft 8 which is supported in the usual frame 9. The pinion 10 on the shaft 8 is engaged by a sector 11 pivoted at 12 in the frame. A slotted arm 13 of the sector is connected by a link 14 to the free end of the tube 5 so that the adjustment of the connection between the tube and the sector may be effected. A spring 15 connected at one end to the frame 9 and at the other end to the shaft 8 tends to hold the pointer at zero pressure in the tube against the stop 16. The dial 17 has suitable graduations in any desired system of units from say zero up to 10 which may be termed the lower range of movement of the tube and pointer. Beyond this range the scale readings are much closer together and through a small angular movement a pressure of several times the total pressure of the lower range may be indicated.

This modified action is accomplished by interposing a spring 18 in the path of movement of the sector 11 which comes into play when the pointer reaches the upper end of the lower scale range. This spring is preferably carried by a socket 19 which is screw threaded into the base 6 of the frame of the tube and multiplying mechanism. This socket may be provided with holes such as 20 to facilitate adjustment of the socket and spring up and down so that the retard action of the spring 18 will begin when the pointer 7 reaches the indicating line marked 10 on the scale. A set nut 21 may be provided for preventing the socket 19 from working loose.

The parts are so constructed and arranged that the retard spring can be assembled together with the Bourdon tube and multiple mechanism and adjusted by means of a jig or gauge before the parts are assembled in the casing 22. The mechanism may be secured to the casing by one or more screws 23 in the usual manner. The spring 18 being small and light in weight, is not likely to be bent or displaced by impact or shock in transportation or otherwise. Furthermore, the spring being in no wise connected to any of the moving parts, it has absolutely no effect upon their movement at any time during the lower scale movement of the pointer.

In Fig. 4 I have shown another form of spring which I believe comes within the broad scope of my invention although the specific form was not devised by me. In this case the spring 24 is U-shaped and secured by a screw 25 directly to the frame 9. The bend of the U comes approximately over the pivot axis 12 of the sector 11 so that the bent end 26 which is interposed in the path of movement of the sector 11 will have substantially a radial swinging movement and thus interpose the proper spring resistance without any friction.

Other modifications of the idea may be made within the broad scope of my invention without departing from its spirit or scope.

I claim:

1. In a retard pressure gauge, a casing, a base secured therein, a Bourdon tube carried by said base, an indicator carried by said base, operating means of connection between said tube and said indicator, and an adjustable spring retard stop carried by said base independently of said casing, for engaging and checking the movement of a part of said means of connection.

2. In a gauge construction, a Bourdon tube, a base for one end of said tube, a pointer moving sector connected to the other end of the tube and a spring carried by said base and located in the path of movement of and serving to modify the movement of the sector and a casing inclosing said parts.

3. In a pressure gauge, a base, a Bourdon tube having one end secured to said base, an indicator carried by said base, means of connection between the movable end of said tube and said indicator, a socket adjustably seated in said base, and a spring carried by said socket for co-acting with a part of said connecting means.

PAUL GAISER.